Sept. 22, 1959      L. S. HEYSER ET AL      2,905,939

PULSE DOPPLER RADAR

Filed Sept. 14, 1956      2 Sheets-Sheet 1

WITNESSES:
Bernard R. Gieguy
Leon J. Laya

INVENTORS
David H. Mooney, Jr. and
Lewis S. Heyser.
BY
ATTORNEY 2,905,939
Patented Sept. 22, 1959

2,905,939
PULSE DOPPLER RADAR

Lewis S. Heyser, Linthicum Heights, and David H. Mooney, Jr., Glen Burnie, Md., assignors to Westinghouse Electric Corporation, East Pittsburgh, Pa., a corporation of Pennsylvania Application September 14, 1956, Serial No. 609,997

6 Claims. (Cl. 343—7.7)

This invention relates to pulse Doppler radar systems and, more particularly, to means in a pulse Doppler radar system for preventing unwanted or spurious signals from appearing in the received video output signal.

In a pulse Doppler radar system pulses of radio frequency energy, transmitted at a certain pulse repetition frequency, are received back at the radar set with a Doppler shift in frequency. The problem is then to discriminate between true returns from moving targets and clutter from stationary objects such as the ground. This discrimination is usually done by filtering techniques which eliminate the ground clutter. The received signals arriving at the radar set are at radio frequency plus or minus a Doppler shift in frequency. The Doppler shift is a very small percentage of the frequency of the transmitted signal; and consequently, it is extremely difficult to provide filters which will discriminate between moving and stationary target returns.

To circumvent this problem, a signal of the original radio frequency of the carrier plus a lower auxiliary frequency is mixed with the received signals arriving at the radar set to produce a difference frequency signal of the lower auxiliary frequency plus or minus a Doppler shift in frequency. This Doppler shift is now a greater percentage of the total frequency of the signal so that by passing the signal through a range gated bandpass amplifier the stationary target returns may be at least partially separated from moving target returns. After passing through the bandpass amplifier, the auxiliary frequency signal is subtracted in a mixer so that only the Doppler shift in frequency remains.

In a pulse Doppler radar system of the type described above, spurious signals arise from many sources, aggravated by the large number of mixers used in such systems. The most serious of these are caused by video harmonics of the pulse reptition frequency, the video harmonics of the range gates, and the harmonics of the pulse reptition frequency near the transmitter frequency. Unfortunately, these spurious signals will appear in the output video signal.

It is an object of this invention to eliminate spurious signals appearing in the video signal of a radar system of the type described above.

A further object of the invention lies in the provision of a multiple signal mixing system in which all harmonics of the main signal are integrally related to a single frequency.

The above and other objects and features of the invention will become apparent from the following detailed description taken in connection with the accompanying drawings which form a part of this specification and in which.

In the following description of the operation of the circuit of Fig. 1 it is to be understood that, for purposes of illustration, the effect of harmonics and spurious signals is neglected and that ideal conditions are assumed.

Figure 1:
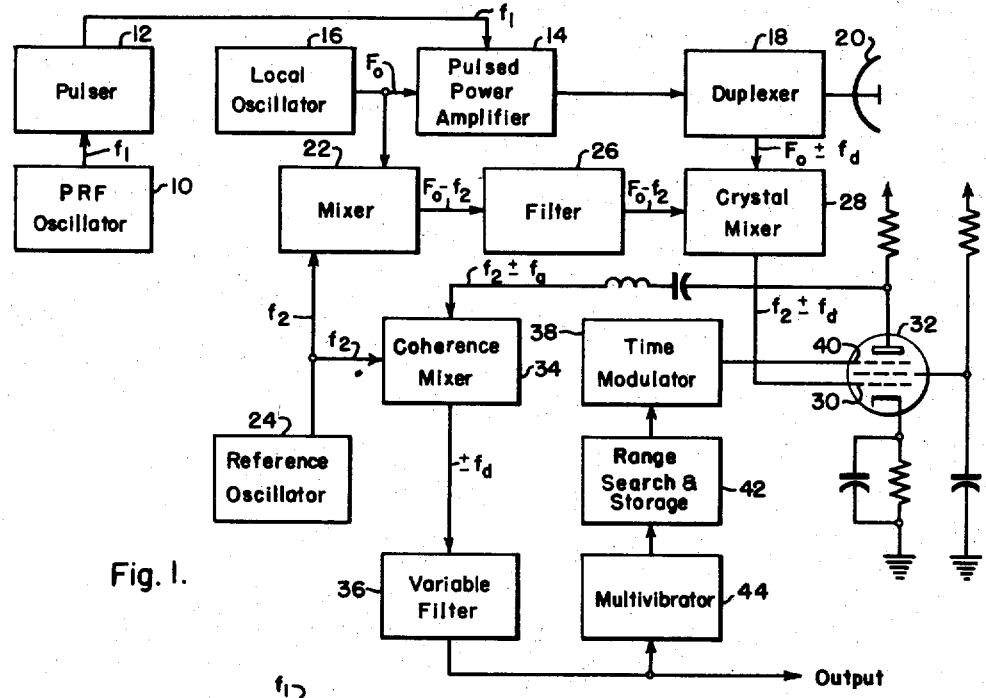
Figure 1 is a block diagram of a pulse Doppler radar system of the prior art included herein to illustrate the defects of such a system.

Referring to Fig. 1, the system shown includes an oscillator 10 which produces an output sine wave of frequency $f_1$. This signal is fed to a pulser or pulse forming network 12 which produces a series of output pulses at frequency $f_1$ which are, in turn, fed to a pulsed power amplifier 14 to periodically enable the amplifier. Radio frequency energy from local oscillator 16 at frequency $F_0$ is also fed to amplifier 14 so that the output of the amplifier fed to duplexer 18 and antenna 20 is a series of pulses of radio frequency energy $F_0$ having a pulse repetition frequency $f_1$.

The output of local oscillator 16 is also fed to a mixer circuit 22 where it is mixed with the output of reference oscillator 24 at frequency $f_2$ to produce an output difference frequency signal $F_0-f_2$. This signal is passed through a filter 26 and fed to a second crystal mixer 28.

Reflected pulses of transmitted energy arriving back at the radar set will have a frequency equal to $F_0$ plus or minus a Doppler shift in frequency $f_d$. After passing from antenna 20 and through duplexer 18, this signal is mixed with the signal of frequency $F_0-f_2$ to produce an output difference frequency signal of $f_2 \pm f_d$. The signal is then applied to the control grid 30 of a range gated band pass amplifier 32 tuned to the immediate vicinity of frequency $f_2$. Assuming that the signal passes through amplifier 32, it is then mixed with a signal from reference oscillator 24 of frequency $f_2$ in coherence mixer 34 to produce an output difference frequency signal of $\pm f_d$ which is then passed through a variable filter circuit 36. The filter circuit per se is fully shown and described in copending application Serial No. 542,820, filed October 26, 1955, and assigned to the assignee of the present application.

A series of spaced output pulses having a pulse repetition frequency equal to $f_1$ from time modulator 38 are applied to the suppressor grid 40 of amplifier 32. These pulses are periodically swept over a time interval equal to the time duration between successive received pulses by means of a range, search and storage circuit 42 which is fully shown and described in copending application Serial No. 524,016, filed July 25, 1955 and assigned to the assignee of the present application. When the output pulses from time modulator 38 coincide in time with the received pulses on grid 30, amplifier 32 will produce an output signal which is fed through coherence mixer 34 and variable filter 36 to a multivibrator or similar switching device 44 which serves to cause the range, search and storage circuit 42 to halt the sweeping action of time modulator 38. The output pulses of time modulator 38 appearing on suppressor grid 30 are thereafter made to follow (i.e., continually coincide in phase with) the return signals on grid 30 by an automatic range tracking circuit, not shown. For a full and detailed description of the operation of the range tracking portion of the system, reference may be had to copending application Serial No. 594,661, filed June 28, 1956, and assigned to the assignee of the present application.

As was stated above, the foregoing description neglected the effect of harmonics. Actually, however, harmonics may arise from many sources. For example, the transmitter pulse RF spectrum is present in large amplitude at the crystal mixer 28 due to imperfect duplexer isolation and to reflections from fixed targets. Since the output of mixer 22 will actually consist of frequencies $F_0$, $F_0+f_2$, and $F_0-f_2$, many possibilities exist for generation of spurious signals. The signal from mixer 22 is filtered in filter 26 in an attempt to reduce the $F_0$ and the $F_0+f_2$ components since only the $F_0-f_2$ component is the desired signal. Of course, there are still some of the other components present to cause spurious signals. For example, the $F_0$ component can beat with the transmitter harmonics from amplifier 14 near $F_0-f_2$ and near $F_0+f_2$ to give signals which will pass through the band pass amplifier 32. Likewise, the $F_0+f_2$ component can beat with the transmitter harmonics near $F_0+2f_2$ and near $F_0$. Also, the $F_0-f_2$ component can beat with the transmitter components near $F_0-2f_2$ and near $F_0$ to produce harmonics which will pass through the band pass amplifier.

Figure 3:
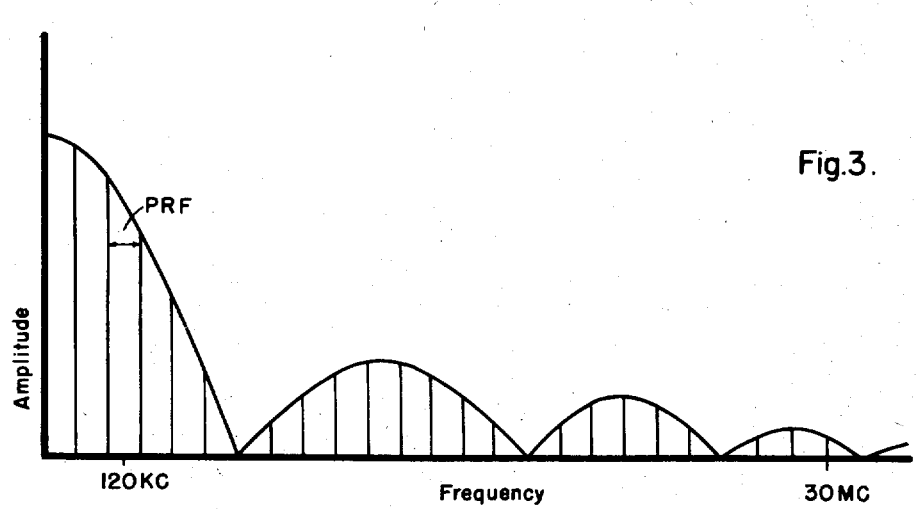
Figs. 3, 4 and 5 are spectrums of various signals appearing in the circuits of Figs. 1 and 2.

For purposes of the present description, it will be assumed that $F_0$ is equal to 9310 mc., $f_1$ is equal to 119.768 kc. and $f_2$ is equal to 30.000 mc. In Fig. 3, the video spectrum of the range gates from time modulator 38 and of the pulse repetition frequency from pulser 12 are shown. The 250th harmonic of the pulse repetition frequency (PRF) is approximately 30 mc., which is the frequency of signal $f_2$ from oscillator 24. The signal in the range of 30 mc., then, may pass through band pass amplifier 32.

Figure 4:
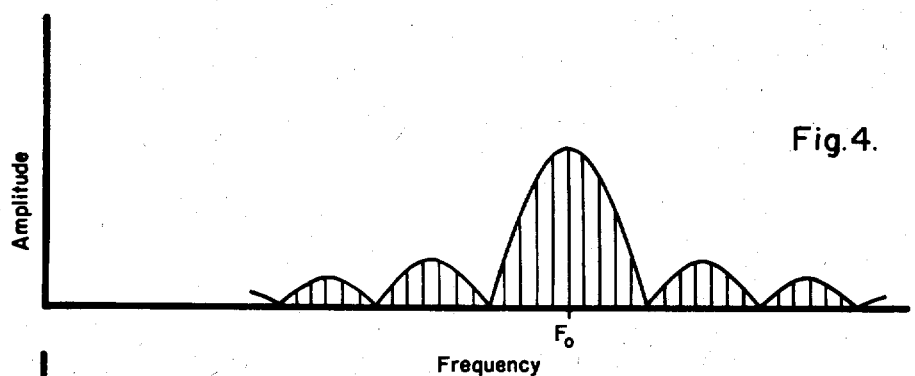
Figure 5:
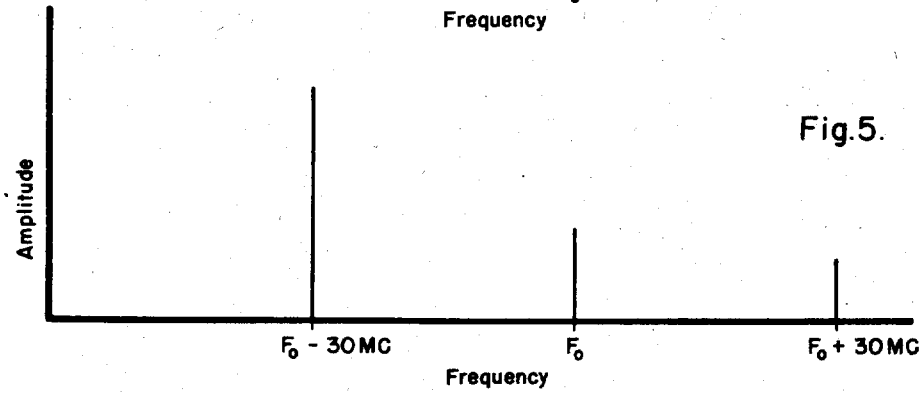

In Fig. 4, the RF spectrum of the radio frequency $F_0$, pulsed at 119.768 kc., is shown as it appears at the output of the pulsed power amplifier 14; and the video spectrum of the signal from mixer 22 is shown in Fig. 5. In the case of the spectrum from amplifier 14, the 501st sidebands of the spectrum are at 9310 mc. $\pm$ 60.004 mc. In Fig. 5, it can be seen that the output of mixer 22 contained a component of 9310 mc.$-$30 mc. and 9310 mc.$+$30 mc. If the 9310 mc.$\pm$60.004 mc. signals from the transmitter beat with the 9310 mc.$\pm$30 mc. components from mixer 22, a 30.004 mc. signal will result. This signal, then, will pass through amplifier 32 to produce a large 4 kc. spurious signal at the output of mixer 34. Similarly, the 250th harmonics of the transmitter spectrum shown in Fig. 4 are at 9310 mc.$\pm$ approximately 30 mc. When the 9310 mc. signal component from mixer 22 beats with these signals, a signal of plus or minus approximately 30 mc. will result which will pass through band pass amplifier 32 and appear at the output of mixer 34.

Figure 2:
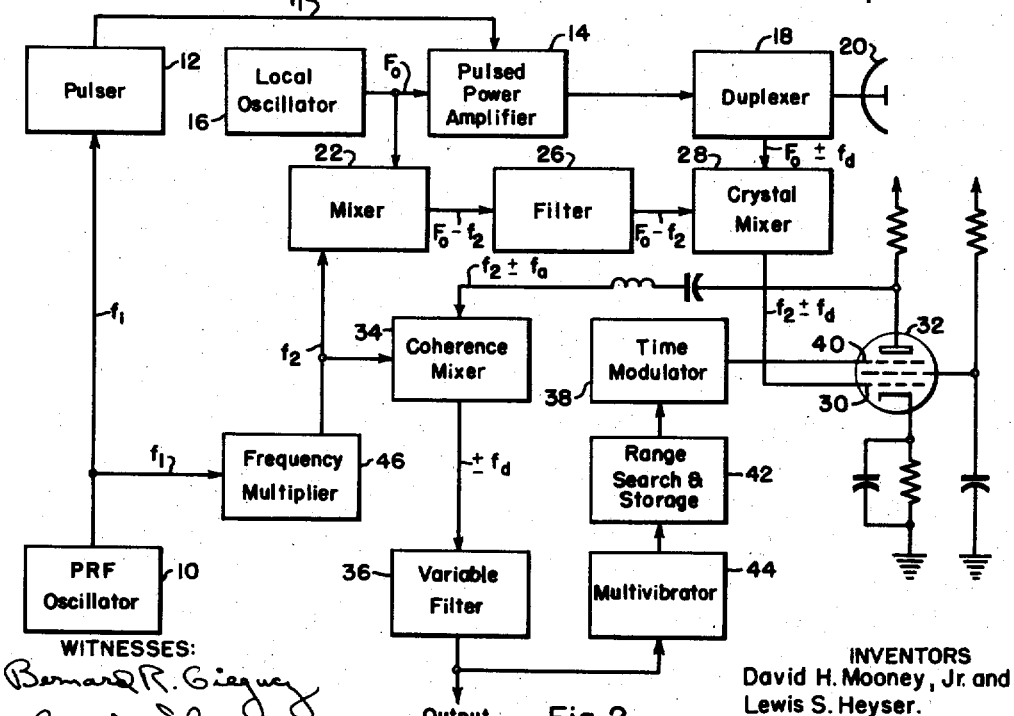
Fig. 2 is a block diagram of the new and improved pulse Doppler radar system of the present invention.

To circumvent the problem of spurious signals, the circuit of the present invention shown in Fig. 2 was derived. Elements in Fig. 2 which correspond to elements shown in Fig. 1 are indicated by like reference numerals. In this case, however, the output of oscillator 10 is passed through a frequency multiplier 46 to produce the signal $f_2$. If it is again assumed that a pulse repetition frequency of approximately 120 kc. is used and that the desired frequency $F_2$ is approximately 30 mc., then a multiplying factor of 256 may be conveniently used. This gives a resultant 30.72 mc. frequency multiplier signal. The two frequencies are now locked so that stability requirements as well as exact frequency selection are easy to meet. No spurious signals can occur because all harmonics of the pulse repetition frequency of oscillator 10, range gates from time modulator 38 and the transmitter output are related to the frequency multiplier signal. Consequently, the sum and difference frequency signals will cancel and only the Doppler shift in frequency will be present at the output of mixer 34. The only beats possible are zero, 120 kc., 240 kc., etc., one of which can cause any difficulty, since they fall outside of the usable Doppler frequency range.

Although the invention has been described in connection with a certain specific embodiment, it should be readily apparent to those skilled in the art that various changes in form and arrangement of parts may be made to suit requirements without departing from the spirit and scope of the invention.

We claim as our invention:

1. In a pulse Doppler radar system, a source of signals of a predetermined frequency $f_1$, means responsive to said source of signals for transmitting pulses of radio frequency energy from said radar system at a pulse repetition frequency $f_1$, means for receiving pulses of transmitted energy reflected from a distant object, frequency multiplying means for increasing the frequency of signals from said source at frequency $f_1$ to a higher frequency $f_2$, first means for mixing the output of said multiplying means at frequency $f_2$ with radio frequency energy, second means for mixing the output of the first mixing means with pulses of energy reflected from said distant object, and third means for mixing the output of said second mixing means with the output of said multiplying means to produce an output difference frequency signal.

2. In a pulse Doppler radar system, a source of signals of a predetermined frequency $f_1$, means responsive to said source of signals for transmitting pulses of radio frequency energy from said radar system at a pulse repetition frequency $f_1$, means for receiving pulses of transmitted energy reflected from a distant object, frequency multiplying means for increasing the frequency of signals from said source at frequency $f_1$ to a higher frequency $f_2$, first means for mixing the output of said multiplying means at frequency $f_2$ with radio frequency energy, and second means for mixing the output of the first mixing means with pulses of energy reflected from said distant object.

3. In a pulse Doppler radar system, a source of signals at a predetermined frequency $f_1$, means responsive to said source of signals for tranmitting pulses of radio frequency energy from said radar system at a pulse repetition frequency $f_1$, means for receiving pulses of transmitted energy reflected from a distant object, frequency multiplying means for increasing the frequency of signals from said source at frequency $f_1$ to another frequency $f_2$, first means for mixing the output of said multiplying means at frequency $f_2$ with radio frequency energy, means for filtering the output of said first mixing means, second means for mixing the output of said filtering means with pulses of energy reflected from said distant object, and third means for mixing the output of said second mixing means with the output of said multiplying means to produce an output difference frequency signal.

4. In a pulse Doppler radar system, a source of signals at a predetermined frequency $f_1$, means responsive to said source of signals for transmitting pulses of radio frequency energy from said radar system at a pulse reptition frequency $f_1$, means for receiving pulses of transmitted energy reflected from a distant object, frequency multiplying means for increasing the frequency of signals from said sources at frequency $f_1$ to another frequency $f_2$, first means for mixing the output of said multiplying means at frequency $f_2$ with radio frequency energy, means for filtering the output of said first mixing means, second means for mixing the output of said filtering means with pulses of energy reflected from said distant object; a band pass filter connected to the output of said second mixing means, and third means for mixing the output of said band pass filter with the output of said multiplying means to produce an output difference frequency signal.

5. In a pulse Doppler radar system, a source of signals of a predetermined frequency $f_1$, a source of radio frequency energy, means responsive to said source of radio frequency energy and to said source of signals for transmitting pulses of radio frequency energy from said radar system at a pulse repetition frequency $f_1$, means for receiving pulses of transmitted energy reflected from a distant object, frequency multiplying means for increasing the frequency of signals from said source at frequency $f_1$ to a higher frequency $f_2$, first means for mixing the output of said multiplying means at frequency $f_2$ with the output of said radio frequency energy source, second means for mixing the output of the first mixing means with pulses of energy reflected from said distant object to produce a difference frequency signal, and third means for mixing the output of said second mixing means with the output of said multiplying means to produce an output difference frequency signal.

6. In a pulse Doppler radar system, a source of signals of a predetermined frequency $f_1$, a directional antenna, means including a duplexer device for transmitting pulses of radio frequency energy from said directional antenna at a pulse repetition frequency $f_1$, said directional antenna being adapted to detect pulses of transmitted energy reflected from a distant object, frequency multiplying means for increasing the frequency of signals from said source at frequency $f_1$ to a higher frequency $f_2$, first means for mixing the output of said multiplying means at frequency $f_2$ with radio frequency energy, second means for mixing the output of the first mixing means with reflected pulses of energy derived from said duplexer, and third means for mixing the output of said second mixing means with the output of said multiplying means to produce an output signal.

References Cited in the file of this patent

UNITED STATES PATENTS

| | | |
|---|---|---|
| 2,659,077 | Emslie | Nov. 10, 1953 |
| 2,677,126 | Webb | Apr. 27, 1954 |